(12) United States Patent
Sato (10) Patent No.: US 8,814,366 B2
(45) Date of Patent: Aug. 26, 2014

(54) LIGHT SOURCE APPARATUS AND PROJECTOR

(75) Inventor: Makoto Sato, Tachikawa (JP)

(73) Assignee: Casio Computer Co., Ltd., Tokyo (JP)

( * ) Notice: Subject to any disclaimer, the term of this patent is extended or adjusted under 35 U.S.C. 154(b) by 375 days.

(21) Appl. No.: 13/412,992

(22) Filed: Mar. 6, 2012

(65) Prior Publication Data

US 2012/0229780 A1    Sep. 13, 2012

(30) Foreign Application Priority Data

Mar. 7, 2011    (JP) .................................. 2011-049099

(51) Int. Cl.
| | |
|---|---|
| G03B 21/20 | (2006.01) |
| G02B 19/00 | (2006.01) |
| G02B 27/48 | (2006.01) |
| G02B 5/02 | (2006.01) |
| G02B 27/09 | (2006.01) |
| G02B 27/10 | (2006.01) |

(52) U.S. Cl.
CPC ............ G02B 5/0263 (2013.01); G03B 21/204 (2013.01); G02B 19/0057 (2013.01); G02B 21/208 (2013.01); G02B 27/48 (2013.01); G02B 27/0994 (2013.01); G02B 27/1033 (2013.01)
USPC ......................................................... 353/85

(58) Field of Classification Search
CPC .... G02B 26/007; G02B 26/008; G02B 26/00; G02B 27/425; G02B 6/0025; H04N 9/3117; G03B 21/208; G03B 21/2013
USPC .............. 353/31, 85; 362/551, 555, 553, 558; 385/34
See application file for complete search history.

(56) References Cited

U.S. PATENT DOCUMENTS

| | | | |
|---|---|---|---|
| 8,308,306 B2 | 11/2012 | Miyazaki et al. | |
| 2008/0284920 A1* | 11/2008 | Facius et al. | 348/751 |
| 2013/0021587 A1 | 1/2013 | Miyazaki et al. | |

FOREIGN PATENT DOCUMENTS

| | | | |
|---|---|---|---|
| JP | 2001-013588 A | | 1/2001 |
| JP | 2006-301114 A | | 11/2006 |
| JP | 2006301114 A | * | 11/2006 |
| JP | 2007-157548 A | | 6/2007 |
| JP | 2008-046523 A | | 2/2008 |
| JP | 2009-194161 A | | 8/2009 |
| JP | 2011-013316 A | | 1/2011 |

OTHER PUBLICATIONS

Japanese Office Action dated Jun. 6, 2013 (and English translation thereof) in counterpart Japanese Application No. 2011-049099.
Japanese Office Action dated Jan. 31, 2013 (and English translation thereof) in counterpart Japanese Application No. 2011-049099.

* cited by examiner

*Primary Examiner* — Thanh Luu
*Assistant Examiner* — Danell L Owens
(74) *Attorney, Agent, or Firm* — Holtz Holtz Goodman & Chick PC (57) ABSTRACT

A light source apparatus is provided comprising:
  a plurality of light sources shining light of different wavelength bands and different luminous intensity distributions;
  groups of collective lenses collecting light from the light sources;
  a light guiding device adapted to distribute uniformly the illuminance of the light collected from the light sources;
  a light guiding optical system collecting the light collected from the light sources to the same optical axis to illuminate the light on to an entrance port of the light guiding device;
  a diffuse plate wheel disposed at the entrance port of the light guiding device and comprising a plurality of segments of different coefficients of diffusion which are arranged in a circumferential direction;
  a motor for rotating the diffuse plate wheel; and
  a light source control device which controls the rotation of the diffuse plate wheel.

10 Claims, 9 Drawing Sheets

DIFFUSE PLATE
FOR RED LIGHT
(SURFACE TREATMENT)

DIFFUSE PLATE
FOR GREEN LIGHT
(SURFACE TREATMENT)

DIFFUSE PLATE
FOR BLUE LIGHT
(SURFACE TREATMENT)

DIFFUSE PLATE
FOR RED LIGHT
(LIGHT SCATTERING PARTICLE)

DIFFUSE PLATE
FOR GREEN LIGHT
(LIGHT SCATTERING PARTICLE)

DIFFUSE PLATE
FOR BLUE LIGHT
(LIGHT SCATTERING PARTICLE)

LIGHT SOURCE APPARATUS AND PROJECTOR

CROSS-REFERENCE TO RELATED APPLICATIONS

This application is based upon and claims the benefit of priority under 35 USC 119 of Japanese Patent Application No. 2011-49099 filed on Mar. 7, 2011, the entire contents of which, including the description, claims, drawings and abstract, are incorporated herein by reference.

BACKGROUND OF THE INVENTION

1. Field of the Invention

The present invention relates to a light source apparatus and a projector.

2. Description of the Related Art

In these days, data projectors are used on many occasions as image projection units which project images including images of screens of personal computers and video images, as well as images based on image data which is stored in memory cards on to a screen. In these projectors, light emitted from a light source is collected on to a micromirror display device called a digital micromirror device (DMD) or a liquid crystal plate for projection of color images on to a screen.

As the use of imaging equipment such as personal computers and DVD players has spread, the application of such data projectors has spread from the business or commercial use, for example, in which they are used as means for presentation to the domestic use. Conventionally, the mainstream of these projectors has been those which use a high-intensity discharge lamp as a light source. However, in recent years, there have been made many developments and proposals on data projectors which use, as a light source, semiconductor light emitting elements such as LEDs and laser diodes.

Then, for example, Japanese Unexamined Patent Publication No. 2007-157548 (JP-A-2007-157548) discloses a light source apparatus which enhances the light utilization efficiency by taking into consideration luminous intensity distribution characteristics which change based on shapes of red, green and blue LED chips and colors of light emitted therefrom and a projector which includes the light source apparatus.

The projector disclosed in JP-A-2007-157548 is such that light emitted from the LED chips is guided to a light guiding device of a predetermined length by adjusting the luminous intensity distribution characteristics of light of the respective colors emitted from the LED chips using luminous intensity distribution members which differ according to the luminous intensity distribution characteristics of the light of the respective colors so emitted so as to enhance the efficiency of utilization of light. However, the projector is not designed to suppress the occurrence of unevenness in illuminance of light in a predetermined plane on to which the light is shone from the light guiding device.

BRIEF SUMMARY OF THE INVENTION

According to a first aspect of the invention, there is provided a light source apparatus including:

a plurality of light sources which illuminate light of different wavelength bands and different luminous intensity distributions;

groups of collective lenses which respectively collect light from the plurality of light sources;

a light guiding device which is disposed on an axis of light collected together from the plurality of light sources and is adapted to distribute uniformly the illuminance of the light collected from the plurality of light sources;

a light guiding optical system which collects the light collected from the plurality of light sources to the same optical axis to illuminate the light on to an entrance port of the light guiding device;

a diffuse plate wheel which is disposed at the entrance port of the light guiding device and which includes a plurality of segments of different coefficients of diffusion which are arranged in a circumferential direction;

a motor for rotating the diffuse plate wheel; and a light source control device which controls the rotation of the diffuse plate wheel in synchronism with the illumination of the plurality of light sources.

In addition, according to a second aspect of the invention, there is provided a projector including:

a light source apparatus;

a display device;

a light source side optical system which guides light emitted from the light source apparatus to the display device;

a projection side optical system which projects an image emitted from the display device on to a screen; and a projector control unit which controls the light source apparatus and the display device, wherein the light source apparatus is the light source apparatus set forth in claim 1 which includes a light source which emits light of red wavelength band, a light source which emits light of blue wavelength band and a light source which emits light of green wavelength band as the plurality of light sources.

Advantages of the invention will be set forth in the following detailed description of the invention or will be obvious in part from the description. Alternatively, the advantages may be learned through practice of the invention. The advantages of the invention may be realized or obtained by instrumentalities or combinations thereof which will be described in the following description.

BRIEF DESCRIPTION OF THE DRAWINGS

The accompanying drawings, which are incorporated in and constitute part of the specification, illustrate an embodiment of the invention and serve to explain the principles of the invention together with the general description give above and the detailed description of the embodiment given below.

DETAILED DESCRIPTION OF THE PREFERRED EMBODIMENT

Hereinafter, an embodiment of the invention will be described by reference to the accompanying drawings.

Figure 1:
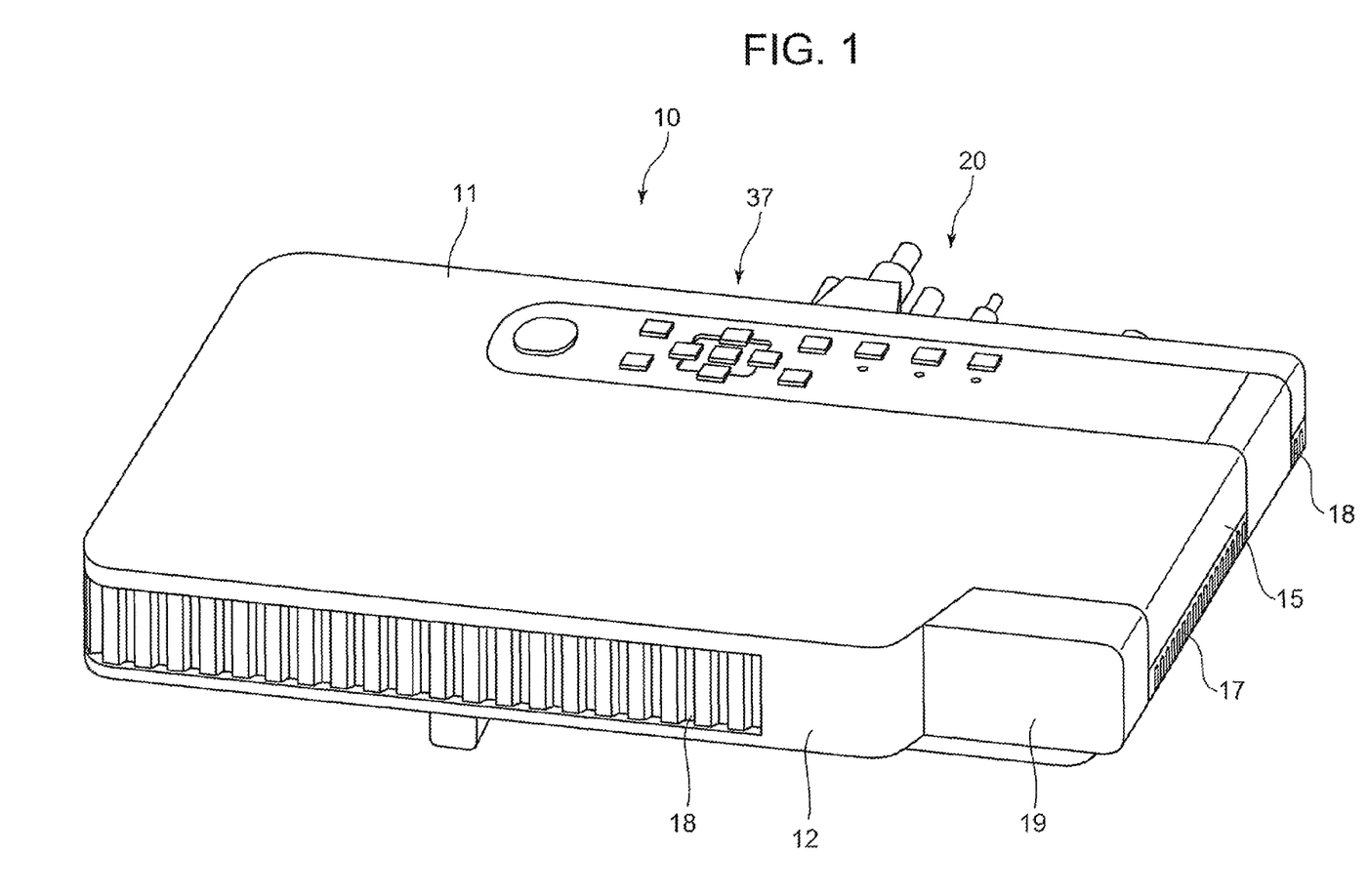
FIG. 1 is a perspective view showing an external appearance of a projector according to an embodiment of the invention.

Hereinafter, am embodiment of the invention will be described in detail by reference to the drawings. FIG. 1 is a perspective view showing an external appearance of a projector 10. In this embodiment, left and right with respect to the projector 10 denote, respectively, left and right directions with respect to a projecting direction, and front and rear denote, respectively, front and rear directions with respect to a direction towards a screen and a traveling direction of a pencil of light.

As is shown in FIG. 1, the projector 10 has a substantially rectangular parallelepiped shape and has a lens cover 19 which covers a projection port which is laid to a side of a front panel 12 which is referred to as a front side panel of a projector casing, as well as a plurality of outside air inlet ports 18 which are formed in the front panel 12. Further, although not shown, the projector 10 includes an Ir reception unit which receives a control signal from a remote controller.

In addition, a keys/indicators unit 37 is provided on an upper side panel 11 of the projector casing. Disposed on this keys/indicators unit 37 are keys and indicators which include a power supply switch key, a power indicator which informs whether the power supply is on or off, a projection switch key which switches on or off the projection by the projector, and an overheat indicator which informs of an overheat condition when a light source apparatus, a display device, a control circuit or the like overheats.

Further, provided on a back side or a back side panel of the projector casing are an input/output connector unit where USB terminals, an image signal input D-SUB terminal for inputting analogue R, G and B image signals, an S terminal, an RCA terminal, an audio output terminal and the like are provided and various types of terminals 20 including a power supply adaptor plug and the like. A plurality of outside air inlet ports are formed in the back side panel. Additionally, pluralities of inside air outlet ports 17 are respectively formed in a right-hand side panel which is a lateral side panel, not shown, of the projector casing and a left-hand side panel 15 which is a lateral side panel shown in FIG. 1. In addition, outside air inlet ports 18 are also formed in a corner portion of the left-hand side panel 15 in the vicinity of the back side panel.

Figure 2:
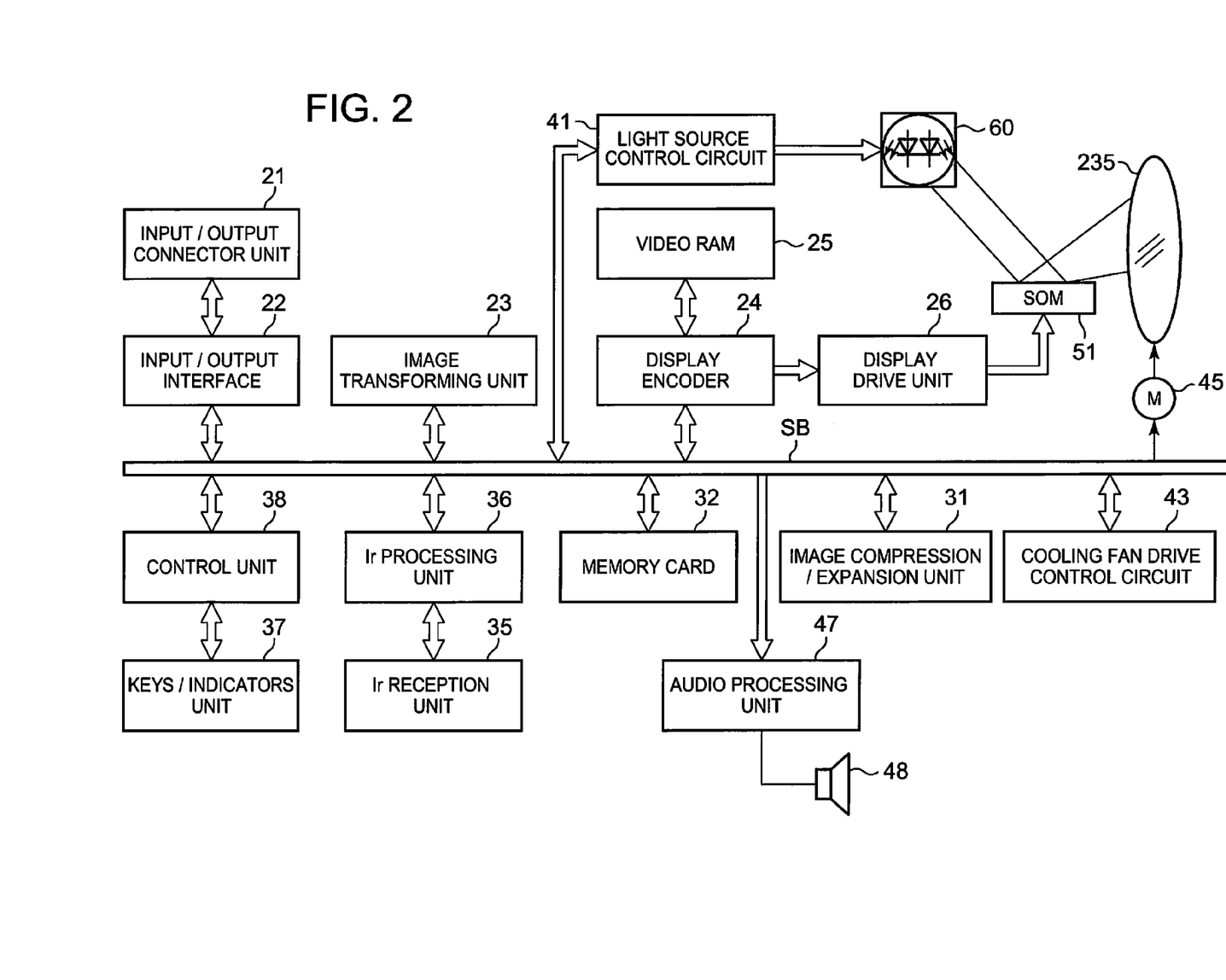
FIG. 2 is a functional block diagram of the projector according to the embodiment of the invention.

Next, a projector control unit of the projector 10 will be described by use of a functional block diagram shown in FIG. 2. The projector control unit includes a control unit 38, an input/output interface 22, an image transforming unit 23, a display encoder 24, a display drive unit 26 and the like.

The control unit 38 governs the control of respective operations of circuitries within the projector 10 and is made up of a CPU, a ROM which stores in a fixed fashion operation programs of various types of settings and a RAM which is used as a work memory.

Image signals of various standards that are inputted from the input/output connector unit 21 are sent via the input/output interface 22 and a system bus (SB) to the image transforming unit 23 where the image signals are transformed so as to be unified into an image signal of a predetermined format which is suitable for display by the projector control unit. Thereafter, the image signals so transformed are outputted to the display encoder 24.

The display encoder 24 deploys the image signals that have been inputted thereinto on a video RAM 25 for storage therein and generates a video signal from the contents stored in the video RAM 25, outputting the video signal so generated to the display drive unit 26.

The display drive unit 26 functions as a display device control unit and drives a display device 51 which is a spatial optical modulator (SOM) at an appropriate frame rate in response to the image signal outputted from the display encoder 24. In this projector 10, a pencil of light which is emitted from a light source apparatus 60 is shone onto the display device 51 via a light source side optical system to thereby form an optical image based on reflected light reflected by the display device 51. The image so formed is then projected on to a screen, not shown, for display thereon via a projection side optical system. In addition, a movable lens group 235 of the projection side optical system is driven by a lens motor 45 for zooming or focusing.

An image compression/expansion unit 31 performs a recording operation in which a luminance signal and a color difference signal of an image signal are data compressed through ADCT and Huffman coding and the compressed data is sequentially written on a memory card 32 which is configured as a detachable recording medium.

Further, when in a reproducing mode, the image compression/expansion unit 31 reads out image data recorded on the memory card 32 and expands individual image data which make up a series of dynamic images frame by frame. Then, the image data is outputted to the display encoder 24 via the image transforming unit 23 so as to enable the display of dynamic images based on the image data stored on the memory card 32.

Operation signals generated at the keys/indicators unit 37 which is made up of the main keys and indicators provided on the upper side panel 11 of the projector casing are sent out directly to the control unit 38. Key operation signals from the remote controller are received by the Ir reception unit 35, and a code signal demodulated at an Ir processing unit 36 is outputted to the control unit 38.

In addition, an audio processing unit 47 is connected to the control unit 38 via the system bus (SB). This audio processing unit 47 includes a circuitry for a sound source such as a PCM sound source. When in a projection mode and a reproducing mode, the audio processing unit 47 converts audio data into analog signals and drives a speaker 48 to output loudly sound or voice based on the audio data.

The control unit 38 controls a light source control circuit 41 which is configured as a light source control unit. This light source control circuit 41 controls individually the emission of light of a red light source device, a green light source device and a blue light source device of the light source apparatus 60 so that light of a predetermined wavelength band which is required when an image is generated is emitted from the light source apparatus 60.

In addition, the light source control circuit 41 controls the rotation of a diffuse plate wheel, which will be described later, in synchronism with the illumination of the light sources.

Further, the control unit 38 causes a cooling fan drive control circuit 43 to detect temperatures through a plurality of temperature sensors which are provided in the light source apparatus 60 so as to control the rotating speed of a cooling fan based on the results of the temperature detection. Additionally, the control unit 38 also causes the cooling fan drive control circuit 43 to make the cooling fan continue to rotate even after the power supply of a projector main body is switched off by use of a timer or the like or to make the power supply to the projector main body be cut off depending upon the results of the temperature detection by the temperature sensors.

Figure 3:
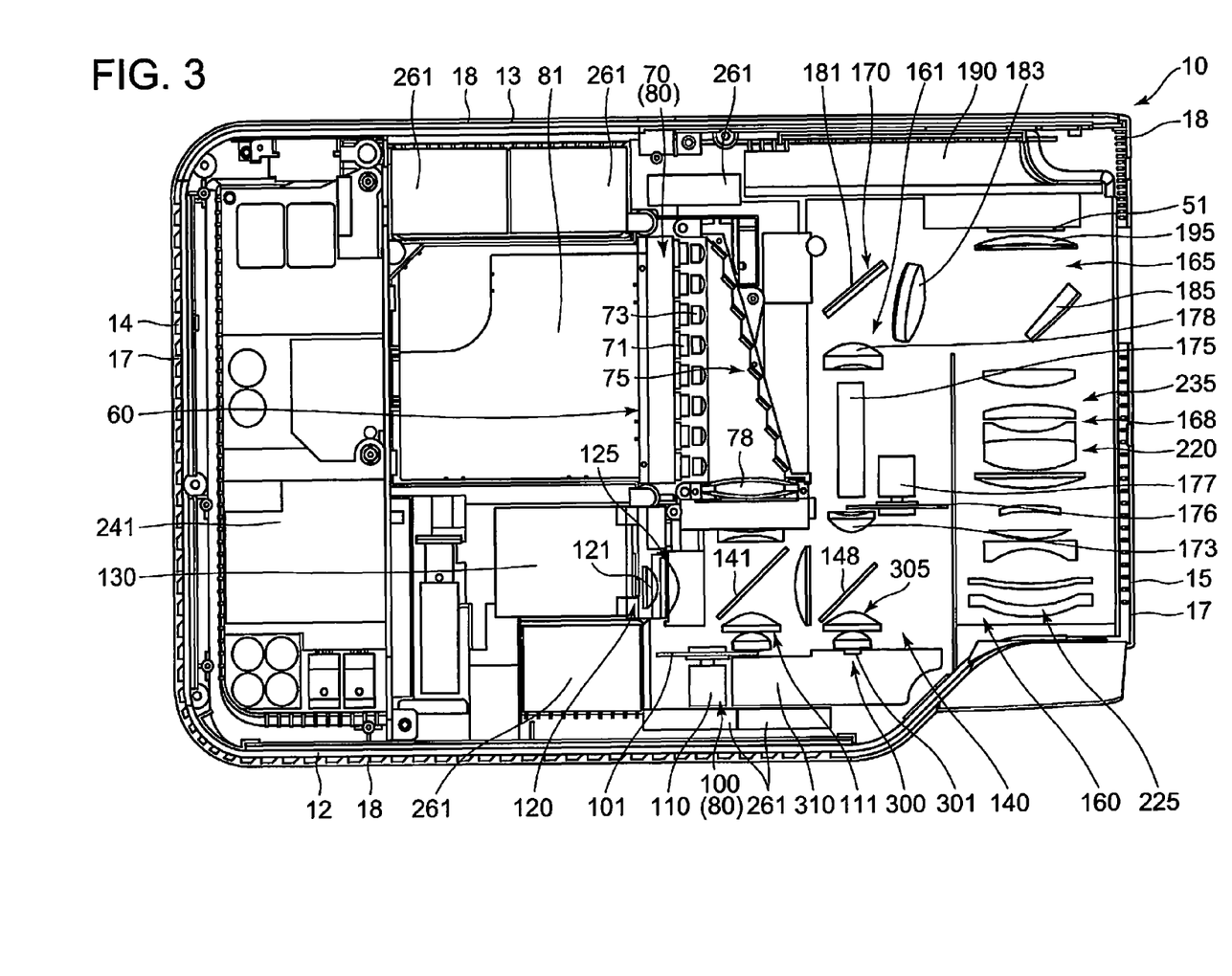
FIG. 3 is an exemplary plan view showing an internal construction of the projector according to the embodiment of the invention.
Figure 4:
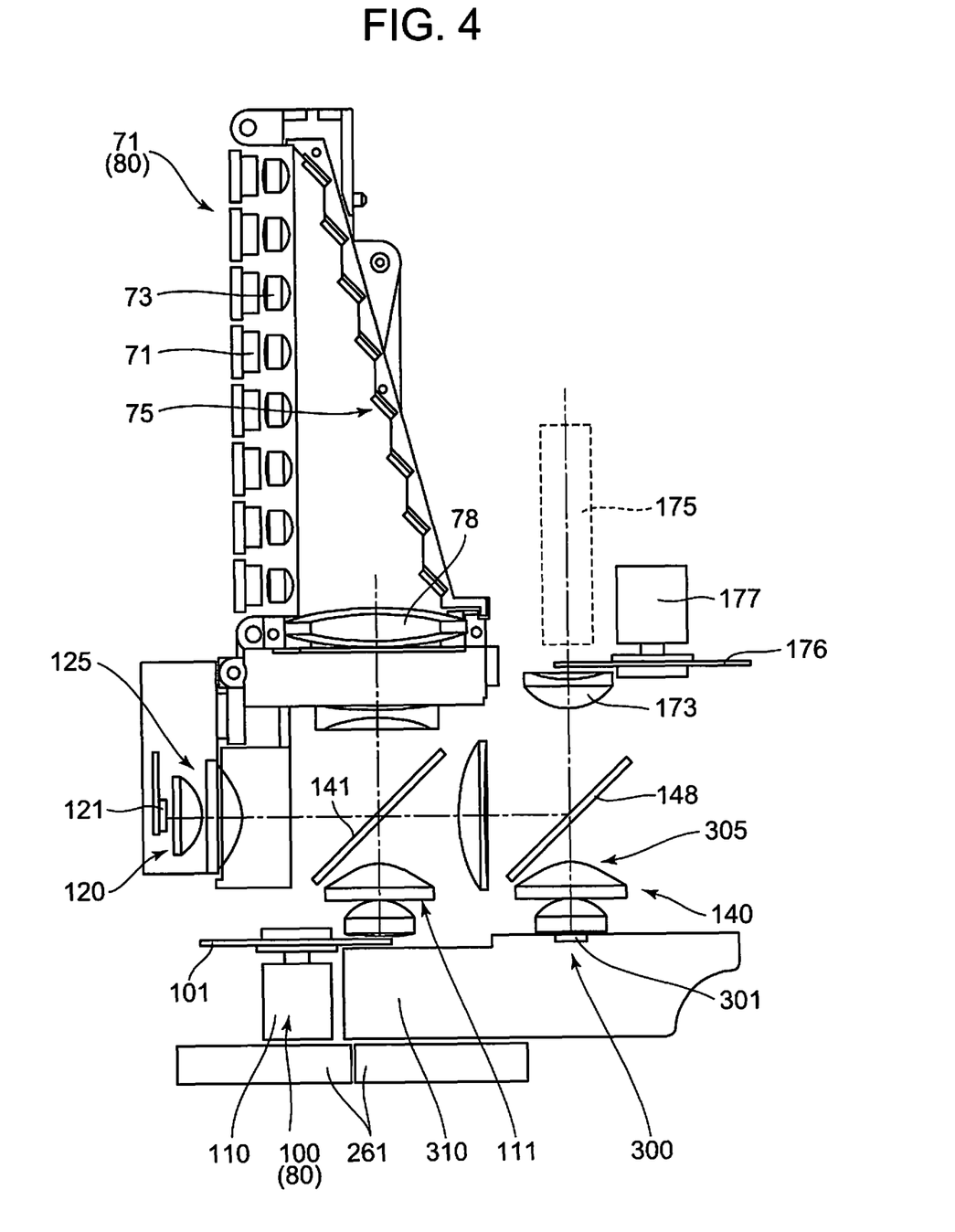
FIG. 4 is an explanatory diagram showing a light guiding optical system according to the embodiment of the invention.

Next, an internal construction of the projector 10 will be described. FIG. 3 is an exemplary plan view showing an internal construction of the projector 10. FIG. 4 is an explanatory diagram of the light source apparatus 60 in the projector 10.

As is shown in FIG. 3, the projector 10 includes a control circuit board 241 in proximity to the right-hand side panel 14. This control circuit board 241 includes a power supply circuit block and a light source control block. In addition, the projector 10 includes the light source apparatus 60 which is provided to a side of the control circuit board 241, that is, at a substantially central portion of the projector casing. Further, the projector 10 includes an optical system unit 160 between the light source 60 and the left-hand side panel 15.

The light source apparatus 60 includes as light source devices a plurality of light sources which illuminate light of different wavelength bands and different luminous intensity distributions.

Specifically speaking, the light source apparatus 60 includes an excitation light shining device 70 as a first light source and a green light source device 80 which is made up of a luminescent light emitting device 100. The excitation light shining device 70 is disposed at a substantially transversely central portion of the projector casing and in proximity to the back side panel 13. The luminescent light emitting device 100 is disposed on an axis of a pencil of light emitted from the excitation light shining device 70 and in proximity to the front side panel 12. The light source apparatus 60 includes further a blue light source device 300 which is a second light source. This blue light source device 300 is disposed in proximity to the front side panel 12 so as to be parallel to a pencil of light which is emitted from the luminescent light emitting device 100. The light source apparatus 60 also includes a red light source device 120 which is a third light source. This red light source device 120 is disposed between the excitation light shining device 70 and the luminescent light emitting device 100. The light source apparatus 60 includes further, as is shown in FIG. 4, a light guiding optical system 140 and a light tunnel 175. This light guiding optical system 140 turns the directions of optical axes of light emitted from the luminescent light emitting device 100, light emitted from the red light source device 120 and light emitted from the blue light source device 300 so that the optical axes of the light of different colors emitted from the luminescent light emitting device 100 and the light source devices 120, 300 are collected to the same optical axis so as to be guided to an entrance port of the light tunnel 175. The green light source device 80 as one of light sources is configured by laser diodes and a luminescent member as described hereinafter and the laser diodes are provided in the excitation light shining device 70 and the luminescent member is provided in the luminescent wheel 101 which is configured as a part of the luminescent light emitting device 100.

As is shown in FIGS. 3 and 4, the light tunnel 175 has a substantially rectangular parallelepiped shape. The light tunnel 175 is a light guiding device which allows the light emitted from the luminescent light emitting device 100 and the red and blue light source devices 120, 300 and collected by the light guiding optical system 140 to enter it from the entrance port and distributes uniformly and without any loss the illuminance of the light at an exit port thereof. When luminous intensity distribution characteristics of light beams of the respective colors which enter it are different, to cope with this, the light tunnel 175 is given a predetermined length which enables the light beam of a color having a small degree of diffusion of luminous intensity distribution characteristic to be emitted from the light tunnel 175 as light of which the illuminance is distributed uniformly at the exit port thereof. The light guiding device is not limited to the light tunnel 175 and hence may be a device such as a solid rod integrator which homogenizes the surface illuminance distribution of light.

The light source apparatus 60 also includes a diffuse plate wheel 176 and a diffuse plate wheel motor 177 which rotates the diffuse plate wheel 176. The diffuse plate wheel 176 is a circular disk-shaped rotating base which is disposed in proximity to the entrance port of the light tunnel 175 and includes a plurality of segments having different coefficients of diffusion in a circumferential direction.

The excitation light shining device 70 of the green light source device 80 includes excitation light sources 71, a group of reflection mirrors 75, a group of collective lenses 78, and a heat sink 81 which is disposed between the excitation light sources 71 and the right-hand side panel 14. The excitation light sources 71 constitute the first light source and are made up of semiconductor light emitting elements which are disposed so that their optical axes are parallel to the back side panel 13. The group of reflection mirrors 75 turns the direction of an axis of light emitted from the corresponding excitation light sources 71 by 90 degrees towards the front side panel 12. The group of collective lenses 78 collects the light emitted from the excitation light sources 71 and reflected by the group of reflection mirrors 75.

The excitation light sources 71 are configured as a group of light sources made up of a total of 24 blue laser diodes which are semiconductor light emitting elements arranged into a matrix of three rows and eight columns. Collimator lenses 73 are disposed individually on optical axes of the blue laser diodes. The collimator lenses 73 are collective lenses which transform light emitted from the blue laser diodes into parallel light. In addition, the group of reflection mirrors 75 is made up of a plurality of reflection mirrors which are arranged as in stairs. The reflection mirrors 75 reduce sectional areas of pencils of light which are emitted from the corresponding excitation light sources 71 in one direction for emission to the group of collective lenses 78.

A cooling fan 261 is disposed between the heat sink 81 and the back side panel 13. The excitation light sources 71 are cooled by the cooling fan 261 and the heat sink 81. Further, a cooling fan 261 is also disposed between the group of reflection mirrors 75 and the back side panel 13, and the group of reflection mirrors 75 and the group of collective lenses 78 are cooled by the cooling fan 261.

The luminescent light emitting device 100 of the green light source device 80 includes a luminescent wheel 101, a wheel motor 110 which rotationally drives the luminescent wheel 101 and a group of collective lenses 111 which collects pencils of luminescent light emitted from the luminescent wheel 101 towards the back side panel 13. The luminescent wheel 101 is disposed so as to be parallel to the front side panel 12, that is, so as to be at right angles to light emitted from the excitation light shining device 70 along an optical axis of the group of collective lenses 78.

The luminescent wheel 101 is a circular disk-shaped metal base. An annular luminescent light emitting area is formed on the luminescent wheel 101 as a depressed portion. This annular luminescent light emitting area receives light emitted from the excitation light sources 71 as excitation light and emits luminescent light of green wavelength band. Thus, the luminescent wheel 101 functions as a luminescent member which receives excitation light to emit luminescent light. In addition, a surface of a side of the luminescent wheel 101 which faces the excitation light sources 71 including the luminescent light emitting area is mirror finished through silver deposition or like this, whereby a reflection plane which reflects light is formed on the surface. A layer of a green luminescent material is laid on this reflection plane.

Light emitted from the excitation light shining device 70 and shone on to the green luminescent material layer on the luminescent wheel 101 excites the green luminescent material in the green luminescent material layer, and pencils of luminescent light are emitted in every direction from the green luminescent material. Then, the pencils of luminescent light so emitted are directed directly towards the excitation light sources 71 or are reflected on the reflection plane of the luminescent wheel 101 so as to be eventually directed towards the excitation light sources 71.

In addition, excitation light which is shone on to the metal base without being absorbed by the luminescent material in the luminescent material layer is reflected by the reflection plane to enter the luminescent material layer again, whereby the luminescent material is excited. Thus, by making the surface of the depressed portion on the luminescent wheel 101 into the reflection plane, the efficiency of utilization of excitation light emitted from the excitation light sources 71 which are green light sources can be enhanced, so that brighter luminescent light can be emitted from the luminescent wheel 101.

In excitation light which is reflected on the reflection plane of the luminescent wheel 101 towards the luminescent material layer, excitation light which is emitted towards the excitation light sources 71 without being absorbed by the luminescent material passes through a first dichroic mirror 141, which will be described later, and luminescent light is reflected by the first dichroic mirror 141. Therefore, excitation light is emitted to the outside of the light source apparatus 60 in no case. Then, a cooling fan 261 is disposed between the wheel motor 110 and the front side panel 12, and the luminescent wheel 101 is cooled by this cooling fan 261.

The red light source device 120 includes a red light source 121 and a group of collective lenses 125 which collects light emitted from the red light source 121. This red light source 121 constitutes the third light source and is disposed so that an optical axis thereof is parallel to the axes of the excitation light sources 71. The red light source device 120 is disposed so that the optical axis thereof intersects light emitted from the excitation light shining device 70 and luminescent light of green wavelength band which is emitted from the luminescent wheel 101.

The red light source 121 is a red light emitting diode which is a semiconductor light emitting element which emits light of red wavelength band. Further, the red light source device 120 includes a heat sink 130 which is disposed on a side of the red light source 121 which faces the right-hand side panel 14. In addition, a cooling fan 261 is disposed between the heat sink 130 and the front side panel 12, and the red light source 121 is cooled by the cooling fan 261.

The blue light source 300 includes a blue light source 301 and a group of collective lenses 305 which collects light emitted from the blue light source 301. The blue light source 301 constitutes the second light source and is disposed so that an optical axis thereof is parallel to light emitted from the luminescent light emitting device 100. The blue light source device 300 is disposed so that the optical axis thereof intersects light emitted from the red light source device 120. The blue light source 301 is a blue light emitting diode which is a semiconductor light emitting element which emits light of blue wavelength band. Further, the blue light source device 300 includes a heat sink 310 which is disposed on a side of the blue light source 301 which faces the front side panel 12. A cooling fan 261 is disposed between the heat sink 310 and the front side panel 12, and the blue light source 301 is cooled by this cooling fan 261.

The light guiding optical system 140 includes collective lenses which collect pencils of light of red, green and blue wavelength bands and dichroic mirrors which turn the directions of the pencils of light of red, green and blue wavelength bands to direct them to the same optical axis.

Specifically speaking, the first dichroic mirror 141 is disposed in a position where optical axes of the groups of collective lenses 78, 111 which collect light of blue wavelength band emitted from the excitation light shining device 70 and light of green wavelength band emitted from the luminescent wheel 101, respectively, intersect an optical axis of the group of collective lenses 125 which collects light of red wavelength band emitted from the red light source device 120. This first dichroic mirror 141 transmits light of blue and red wavelength bands and reflects light of green wavelength band to turn the direction of the green light by 90 degrees towards the left-hand side panel 15.

In addition, a second dichroic mirror 148 is disposed in a position where an optical axis of the group of collective lenses 305 which collects light of blue wavelength band emitted from the blue light source device 300 intersects the optical axis of the group of collective lenses 125 which collects light of red wavelength band emitted from the red light source device 120. This second dichroic mirror 148 transmits light of blue wavelength band and reflects light of green and red wavelength bands by 90 degrees towards the back side panel 13. A collective lens is disposed between the first dichroic mirror 141 and the second dichroic mirror 148. Further, a collective lens 173 is disposed in proximity to the light tunnel 175. This collective lens 173 collects light source light to the entrance port of the light tunnel 175.

The optical system unit 160 is configured into a substantially U-shape by three blocks such as an illumination side block 161 which is positioned to a left-hand side of the excitation light shining device 70, an image generating block 165 which is positioned in proximity to a position where the back side panel 13 intersects the left-hand side panel 15, and a projection side block 168 which is disposed between the light guiding optical system 140 and the left-hand side panel 15.

The illumination side block 161 includes part of a light source side optical system 170 which guides light source light emitted from the light source apparatus 60 to the display device 51 that the image generating block 165 includes. Included as the light source side optical system 170 that the illumination side block 161 possesses are a collective lens 178 which collects light emitted from the light source apparatus 60 which is the light source apparatus including the light tunnel 175 which transforms a pencil of light into a pencil of light in which the illuminance thereof is uniformly distributed, and a light direction turning mirror 181 which turns the direction of an axis of a pencil of light emitted from the light tunnel 175 towards the image generating block 165.

The image generating block 165 has, as the light source side optical system 170, a collective lens 183 which collects the light source light which is reflected on the light direction turning mirror 181 to the display device 51 and a shining mirror 185 which illuminates the pencil of light that has passed through the collective lens 183 on to the display device 51 at a predetermined angle. The image generating block 165 includes further a DMD which is the display device 51. A heat sink 190 is disposed between the display device 51 and the back side panel 13 for cooling the display device 51. Thus, the display device 51 is cooled by the heat sink 190. In addition, a condenser lens 195 is disposed in proximity to a front side of the display device 51 as part of a projection side optical system 220.

The projection side block 168 has a group of lenses of the projection side optical system 220 which projects "on" light which is reflected on the display device 51 on to the screen. This projection side optical system 220 is made up of a variable focus lens having a zooming function which includes a group of fixed lenses 225 which is incorporated in a fixed lens barrel and a group of movable lenses 235 which is incorporated in a movable lens barrel, and the group of movable lenses 235 are moved by a lens motor for zooming and focusing.

Figure 5A:
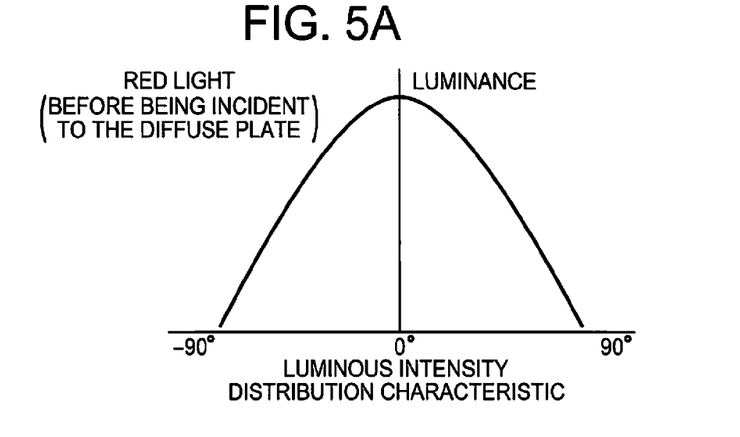
FIG. 5A shows explanatory diagrams illustrating luminous intensity distribution characteristics of light of red color shone on to diffuse plates according to the embodiment of the invention.
Figure 5B:
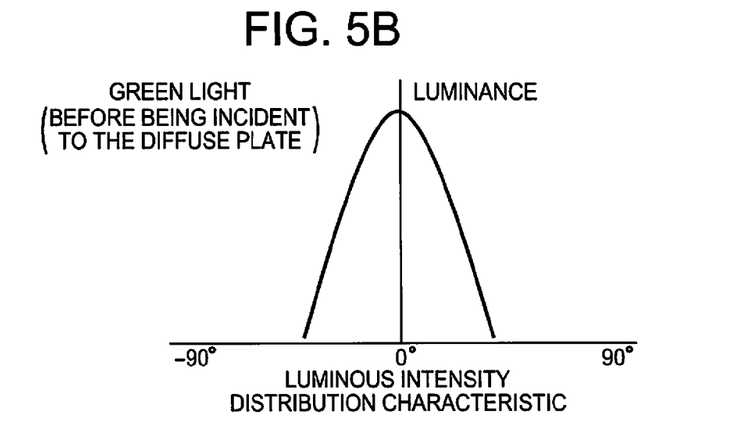
FIG. 5B shows explanatory diagrams illustrating luminous intensity distribution characteristics of light of green color shone on to diffuse plates according to the embodiment of the invention.
Figure 5C:
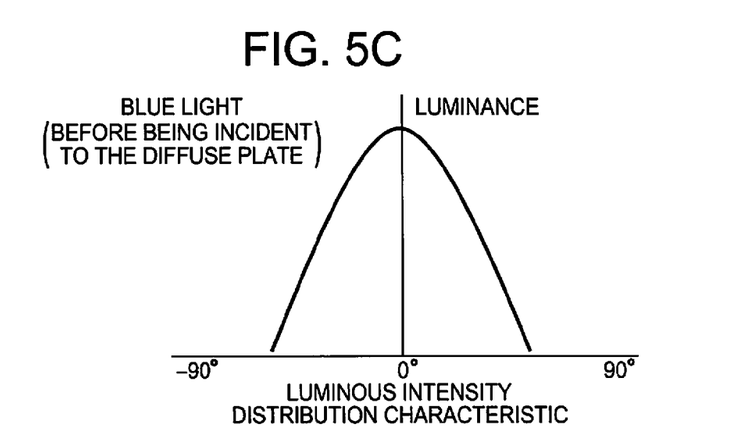
FIG. 5C shows explanatory diagrams illustrating luminous intensity distribution characteristics of light of blue color shone on to diffuse plates according to the embodiment of the invention.

Next, luminous intensity distribution characteristics of light of the respective colors which enters the light tunnel 175 will be described by reference to FIGS. 5A, B and C. FIGS. 5A, B and C shows explanatory diagrams of luminous intensity distribution characteristics of light of the respective colors which is collected to the entrance port of the light tunnel 175.

Luminous intensity distribution characteristics of light of the respective colors which is collected by the light guiding optical system 140 to enter the light tunnel 175 differ individually as shown, for example, in FIGS. 5A, B and C depending on the light sources having different luminous intensity distribution characteristics and the setting of the optical systems such as the collective lenses on the optical paths.

Red light and blue light are light emitted from the light emitting diodes, and therefore, the linear traveling performances of the red and blue light are lower than that of laser light, and the red and blue light spreads to a certain extent. Thus, when comparing the luminous intensity distribution characteristics of the light of the respective colors with one another, as is shown in FIG. 5A, the luminous intensity distribution characteristics of the red light are the widest, and the luminous intensity distribution characteristics of the blue light are not so wide as those of the red light, as is shown in FIG. 5C.

In addition, green light is green luminescent light which is excited and diverged by shining excitation light having a good linear traveling performance and emitted by the laser diode on to the green luminescent material. Thus, as is shown in FIG. 5B, the luminous intensity distribution characteristics of the green light are narrower than those of the red and blue light, and the luminance is concentrated more to the center, when compared with the luminous intensity distribution characteristics of the red and blue light.

The length of the light tunnel 175 needs to be increased so that the illuminance of a pencil of green luminescent light having the luminous intensity distribution characteristics which are narrowed towards the center and hence having a small degree of diffusion is uniformly distributed at the exit port of the light tunnel for emission therefrom.

Then, the length of the light tunnel 175 can be shortened by making the luminous intensity distribution characteristics of the pencil of green luminescent light which are narrowed towards the center to provide the small degree of diffusion equal to the luminous intensity distribution characteristics of the red light which are the widest.

Figure 6:
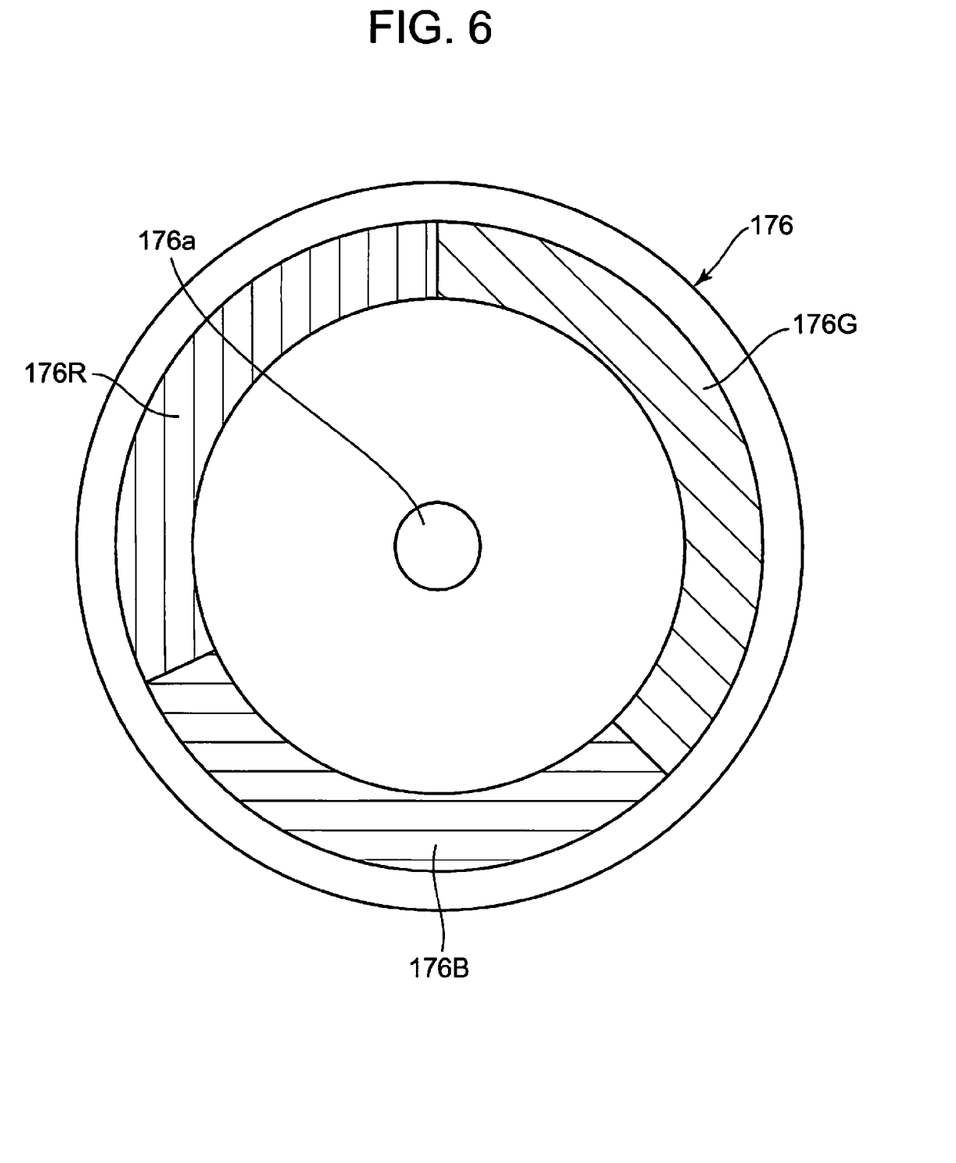
FIG. 6 is a front view of a diffuse plate wheel according to the embodiment of the invention.

Next, the diffuse plate wheel 176 will be described by reference to FIG. 6 which is provided to equalize the luminous intensity distribution characteristics of the light of the respective colors which enters the light tunnel 175 of the invention. FIG. 6 is a front view of the diffuse plate wheel 176.

As is shown in FIG. 6, the diffuse plate wheel 176 is a base which is a circular glass plate having in the center thereof a wheel hole 176a in which a motor shaft is mounted. Three arc-shaped cutout portions are provided in the base, and diffuse plates 176R, 176G, 176B having different diffusion characteristics are fitted in the cutout portions. Thus, the diffuse plate wheel 176 is constructed to have three segments functioning as three diffusing areas.

These diffuse plates 176R, 176G, 176B are optical parts which provide a diffuse effect without changing the wavelength bands of light which enters them. In addition, the diffuse plates 176R, 176G, 176B have an arc shape which corresponds to the cutout portions in the diffuse plate wheel 176 and are mounted on a side of the diffuse plate wheel 176 which faces the light source so as to close the arc-shaped cutout portions. To provide the diffuse effect, these diffuse plates 176R, 176G, 176B are surface-treated so that, for example, minute irregularities are formed thereon.

The diffuse plate wheel motor 177 is a driving device for rotating the diffuse plate wheel 176 in a circumferential direction, and the rotation of the diffuse plate motor 177 is controlled by the light source control circuit 41 as the light emission of the individual light sources is controlled.

Namely, the diffuse plate wheel 176 functions as the diffuse plates 176R, 176G, 176B which provides the light of the respective colors with predetermined diffuse effects by shining the light emitted from the individual light sources on to the predetermined diffuse plates 176R, 176G, 176B which are placed on one side of the diffuse plate wheel 176 which is rotating.

Figure 7A:
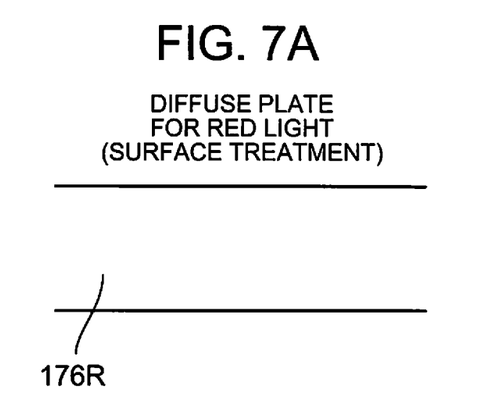
FIG. 7A shows sectional views of the diffuse plates for red light which are surface treated according to the embodiment of the invention.
Figure 7B:
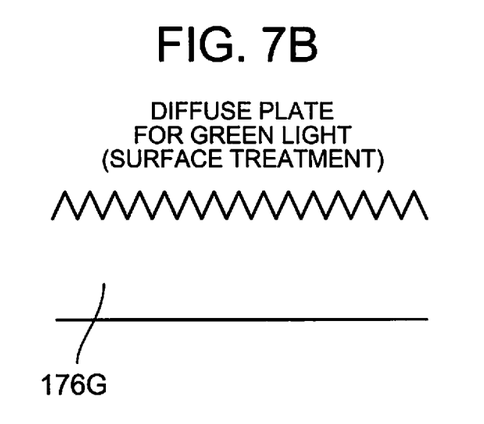
FIG. 7B shows sectional views of the diffuse plates for green light which are surface treated according to the embodiment of the invention.
Figure 7C:
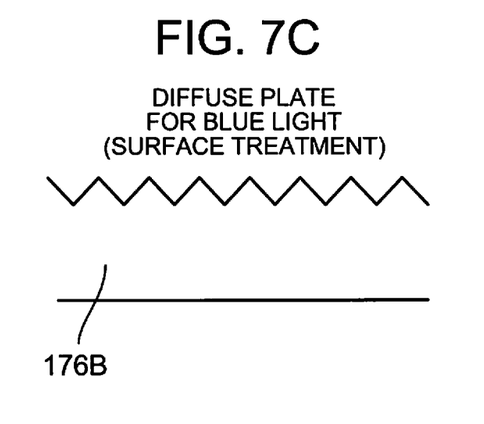
FIG. 7C shows sectional views of the diffuse plates for Blue light which are surface treated according to the embodiment of the invention.
Figure 8A:
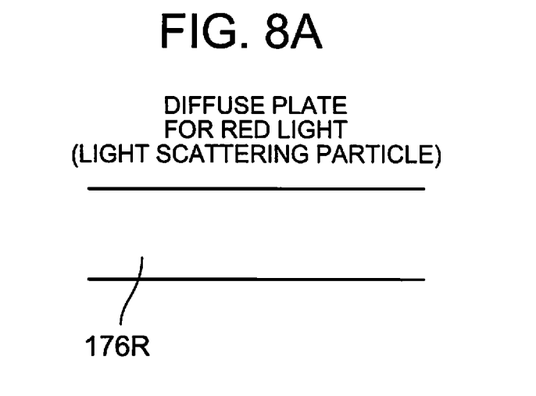
FIG. 8A shows sectional views of the diffuse plates for red light which contain light diffusing particles according to the embodiment of the invention.

Next, the configurations of the diffuse plates 176R, 176G, 176B will be described by reference to FIGS. 7A, B and C and 8A, B and C. FIGS. 7A, B and C shows sectional views showing different surface roughnesses of the diffuse plates 176R, 176G, 176B which are provided to equalize the luminescent intensity distribution characteristics of the light of the respective colors. FIGS. 8A, B and C shows sectional views showing different content densities of spherical light scattering particles which are contained in respective interiors of the diffuse plates 176R, 176G, 176B which are provided to equalize the luminescent intensity distribution characteristics of the light of the respective colors.

The diffuse plates 176R, 176G, 176B are configured so as to diffuse incident light by forming minute irregularities on the surfaces of the glass material by applying a blast finishing to the surfaces. The diffusing properties of the diffuse plates 176R, 176G, 176B can be changed by changing the magnitude of minute irregularities formed.

The magnitude of minute irregularities can be set based on arithmetic mean roughness, maximum height of irregularities, ten point average of irregularities, and mean interval of irregularities which are parameters expressing surface roughness. Here, a case will be described in which the diffusing properties are changed by changing the mean interval of minute irregularities.

To equalize the different luminous intensity distribution characteristics of the light of the respective colors as are shown in FIGS. 5A, B and C, the three diffuse plates 176R, 176G, 176B are disposed in the three diffusing areas on the diffuse plate wheel 176, and minute irregularities which differ in magnitude are formed on the diffuse plates 176R, 176G, 176B.

In the light of the respective colors entering the light tunnel 175, the red light has the widest luminous intensity distribution characteristics. Therefore, no surface treatment is applied to the red diffuse plate 176R at all as is shown in FIG. 7A. Thus, the red diffuse plate 176R is characterized in that the coefficient of diffusion thereof is zero. Alternatively, the mean interval of minute irregularities is increased so that minute irregularities are formed slightly so as to provide low diffusion characteristics.

In the light of the respective colors entering the light tunnel 175, the blue light has the luminous intensity distribution characteristics which are slightly narrower than those of the red light. Therefore, a surface treatment in which the mean interval of minute irregularities is set to a predetermined value is applied to the blue diffuse plate 176B so as to form minute irregularities accordingly thereon as is shown in FIG. 7C, so as to enhance the diffusing characteristics of the blue diffuse plate 176B.

In the light of the respective colors entering the light tunnel 175, the green light has the narrowest luminous intensity distribution characteristics. Therefore, a surface treatment in which the mean interval of minute irregularities is set narrowest is applied to the green diffuse plate 176G so as to form minute irregularities accordingly thereon as is shown in FIG. 7B, so as to enhance further the diffusing characteristics of the green diffuse plate 176G.

For example, in the event that the luminous intensity distribution characteristics of the red and blue light are the same, no surface treatment may be applied to the red diffuse plate 176R and the blue diffuse plate 176G at all so that the coefficient of diffusion thereof becomes zero. On the other hand, a surface treatment in which the mean interval of minute irregularities is set to a predetermined value may be applied to the green diffuse plate 176G.

Namely, by providing the diffuse plate wheel 176 having the diffuse plates 176R, 176G, 176B which are or are not surface treated so as to correspond to the luminous intensity distribution characteristics of the light of the respective colors in proximity to the entrance port of the light tunnel 175, the light of the respective colors can be diffused to suppress the occurrence of unevenness in illuminance therein so as to be shone on to a predetermined plane such as the display device 51 while enhancing the efficiency of utilization of light without having to increase the length of the light tunnel 175 unnecessarily.

The diffuse plate wheel 176 may be constructed so as to have those three diffusing areas by directly working the circular glass plate which is the base of the diffuse plate wheel 176 to produce minute irregularities on the diffusing areas so as to generate the predetermined diffusing characteristics thereon.

Figure 8B:
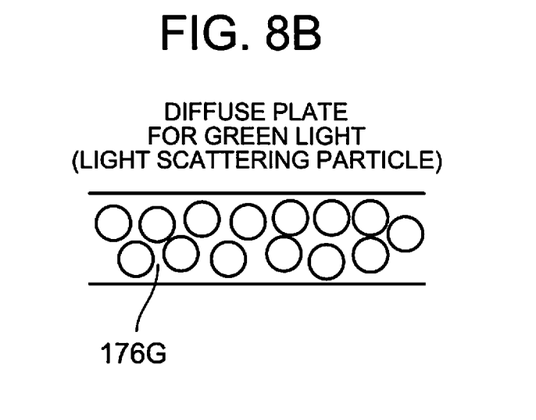
FIG. 8B shows sectional views of the diffuse plates for green light which contain light diffusing particles according to the embodiment of the invention.
Figure 8C:
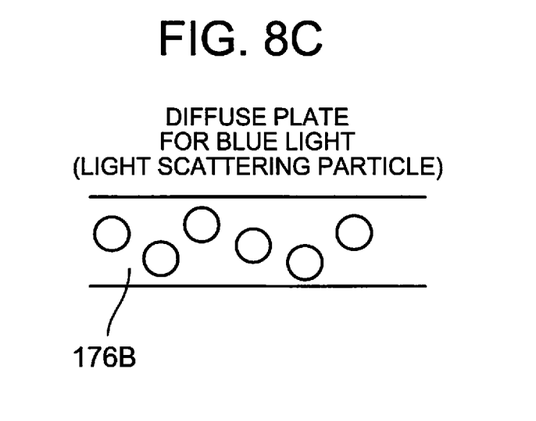
FIG. 8C shows sectional views of the diffuse plates for blue light which contain light diffusing particles according to the embodiment of the invention.

Additionally, the diffuse plates 176R, 176G, 176B can also be constructed so as to diffuse incident light by a base made of a medium such as a binder which contains spherical light scattering particles having a large refraction index. The diffuse plates 176R, 176G, 176G are formed, for example, by adding inorganic titanium oxide or barium sulfate as spherical light scattering particles to a transparent resin such as an acryl resin or polycarbonate resin.

Then, by changing the content densities, size or constituents of the light scattering particles, the diffusing characteristics of the diffuse plates 176R, 176G, 176B can be changed. Here, a case will be described in which the diffusing characteristics of the diffuse plates 176R, 176G, 176B are changed by changing the content densities of light scattering particles therein.

In forming the red diffuse plate 176 of light scattering particles, since the red light has the widest luminous intensity distribution characteristics in the light of the respective colors entering the light tunnel 175, no light scattering particles are contained in the red diffuse plate 176R at all as is shown in FIG. 8A or a slight amount of light scattering particles is contained therein so as to reduce the diffusing characteristics of the red diffuse plate 176R.

In forming the blue diffuse plate 176B of light scattering particles, since the blue light has the luminous intensity distribution characteristics which are slightly narrower than those of the red light in the light of the respective colors entering the light tunnel 175, the content density of light scattering particles is set to a predetermined value as is shown in FIG. 8C so that the diffusing characteristics of the blue diffuse plate 176B are enhanced.

In forming the green diffuse plate 176G of light scattering particles, since the green light has the narrowest luminous intensity distribution characteristics in the light of the respective colors entering the light tunnel 175, the content density of light scattering particles is increased to a largest value in the three diffuse plates as is shown in FIG. 8B so that the diffusing characteristics of the green diffuse plate 176G are enhanced further.

Figure 9A:
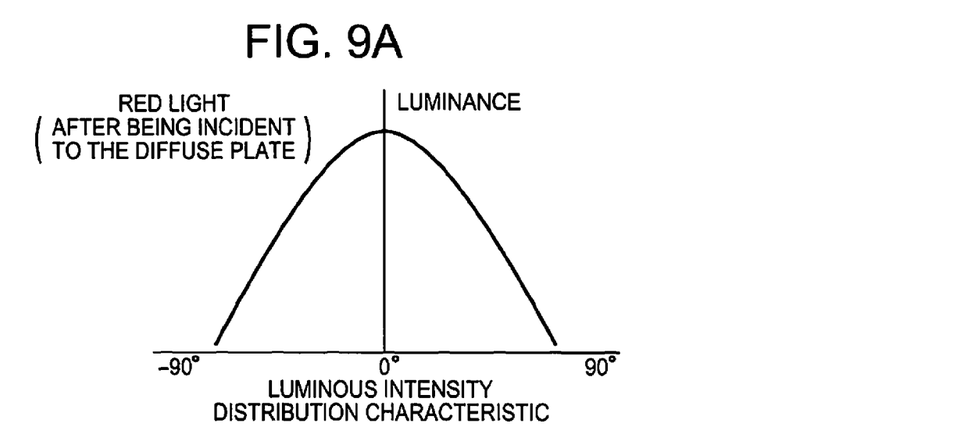
FIG. 9A shows explanatory diagrams illustrating luminous intensity distribution characteristics of light of red color emitted from the diffuse plates according to the embodiment of the invention.
Figure 9B:
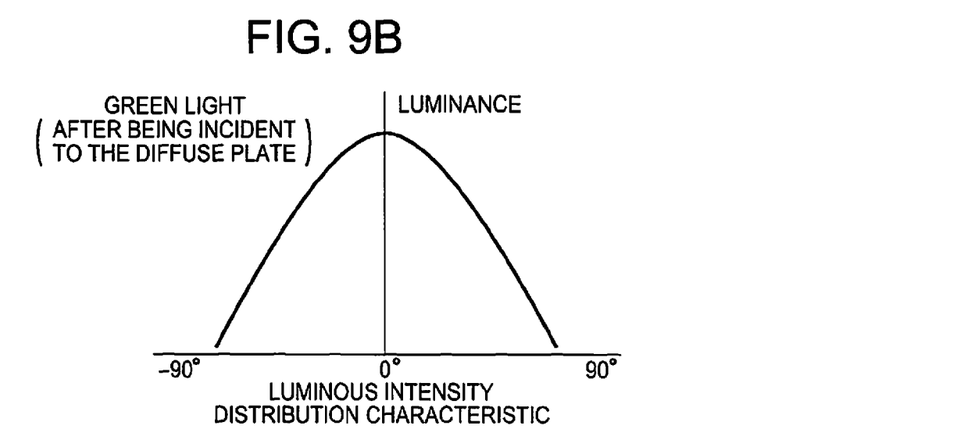
FIG. 9B shows explanatory diagrams illustrating luminous intensity distribution characteristics of light of green color emitted from the diffuse plates according to the embodiment of the invention.
Figure 9C:
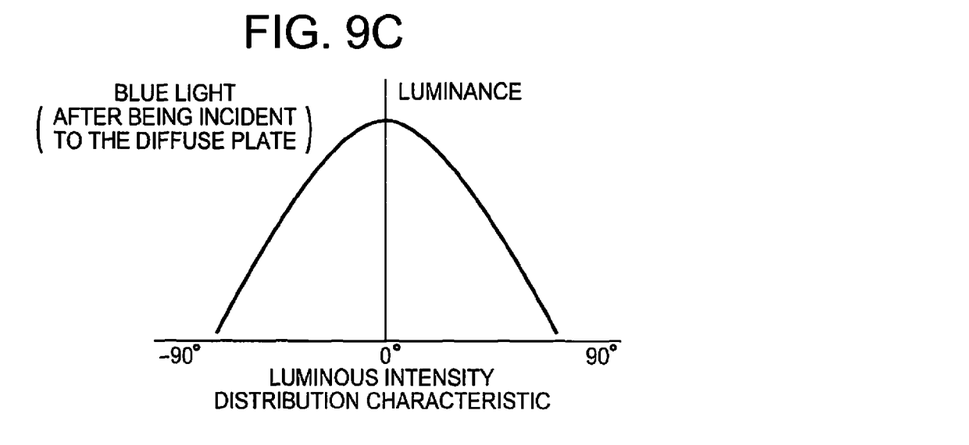
FIG. 9C shows explanatory diagrams illustrating luminous intensity distribution characteristics of light of blue color emitted from the diffuse plates according to the embodiment of the invention.

In the three diffusing areas on the diffuse plate wheel 176, the diffuse plates 176R, 176G, 176B may each be formed by combining a diffuse plate of which the diffusing effect is given by applying the blasting treatment thereto and a diffuse plate of which the diffusing effect is given by the base formed to have the corresponding content density of spherical light scattering particles. Thus, the luminous intensity distribution characteristics of the light of the respective colors are equalized as is shown in FIGS. 9A, B and C by adopting the diffuse plates 176R, 176G, 176B having predetermined diffusing characteristics.

The luminous intensity distribution characteristics of the light of the respective colors entering the light tunnel 175 are not limited to those described above. Even in an optical system in which the luminous intensity characteristics of red light or blue light are the narrowest, diffuse plates 176R, 176G, 176B may only have to be selected for adoption so that light having narrow luminous intensity distribution characteristics is equalized with light having wide luminous intensity distribution characteristics.

In this embodiment, the light source apparatus is described in which the blue laser diodes which are semiconductor light emitting elements which emit laser light of blue wavelength band are adopted as the excitation light sources 71 which make up the excitation light shining device 70 which excites the luminescent material which emits light of green wavelength band and the red light source device 120 and the blue light source device 300 which are made up of the red and blue light emitting diodes are provided to emit light of red wavelength band and light of blue wavelength band, respectively.

However, the invention is not limited to the embodiment but can be altered, modified or improved freely without departing from the spirit and scope of the invention.

For example, a configuration may be adopted in which instead of providing a blue light source device 300, a luminescent wheel 101 on which a luminescent material layer which emits light of green wavelength band and a diffuse transmission layer are laid and an optical system made up of a mirror or mirrors and a lens or lenses which guide light of blue wavelength band which passes through the diffuse transmission layer of the luminescent wheel 101 to a diffuse plate wheel 176 as adopted in the invention are provided. By adopting this configuration, the invention can also be applied to the light source apparatus in which excitation light emitted from blue laser diodes of an excitation light shining device 70 which emit laser light of blue wavelength band is shone on to the rotating luminescent wheel 101 so as to respectively emit green light and blue light.

In this way, even in the event that the light source apparatus is made up of only the excitation light shining device 70 and a red light source device 120 without providing a blue light source device 300, the occurrence of unevenness in illuminance in light emitted from the light source apparatus can be suppressed.

In addition, a configuration may also be adopted in which light sources are provided only for an excitation light shining device 70 without providing a red light source device 120 and a blue light source device 300 and a luminescent wheel 101 is used on which red and green luminescent material layers and a diffuse transmission layer are laid in a circumferential direction.

In the case of adopting this configuration, an optical system is provided which is made up of a mirror or mirrors and a lens or lenses which guide light of red wavelength band, light of green wavelength band and light of blue wavelength band which are emitted by shining excitation light on to the luminescent material layer of red wavelength band, the luminescent material layer of green wavelength band and the diffuse transmission layer to a diffuse plate wheel 176 as adopted in the invention. By adopting this configuration, the invention can also be applied to the light source apparatus in which excitation light emitted from the blue laser diodes of the excitation light shining device 70 which emit laser light of blue wavelength band is shone on to the rotating luminescent wheel 101 so as to respectively emit red light, green light and blue light.

In this way, even in the event that the light source apparatus is made up of only the light sources of the excitation light shining device 70 without providing a red light source device 120 and a blue light source device 300, the occurrence of unevenness in illuminance in light emitted from the light source apparatus can be suppressed.

Additionally, a configuration may be adopted in which in place of the blue laser diodes, ultraviolet laser diodes which emit ultraviolet laser light are used as excitation light sources 71 which are semiconductor light emitting elements of an excitation light shining device 70. In the case of this configuration being adopted, the luminescent wheel 101 is used on which a red area, a green area and a blue area are laid in a circumferential direction. The red area is an area where a luminescent material is laid which emits luminescent light of red wavelength band. The green area is an area where a luminescent material is laid which emits luminescent light of green wavelength band. The blue area is an area where a luminescent material is laid which emits luminescent light of blue wavelength band.

Then, an optical system is provided which is made up of a mirror or mirrors and a lens or lenses which guide light of red wavelength band, light of green wavelength band and light of blue wavelength band which are emitted by shining excitation light on to the luminescent material layer of red wavelength band, the luminescent material layer of green wavelength band and the luminescent material layer of blue wavelength band on the luminescent wheel 101 to a diffuse plate wheel 176 as adopted in the invention. Thus, the invention can also be applied to the light source apparatus in which excitation light emitted from the ultraviolet laser diodes of the excitation light shining device 70 which emit ultraviolet laser light is shone on to the rotating luminescent wheel 101 so as to respectively emit red light, green light and blue light.

In this way, even in the event that the light source apparatus is made up of only the ultraviolet laser diodes which emit ultraviolet laser light having a high energy density as excitation light sources 71 of the excitation light shining device 70 without providing a red light source device 120 and a blue light source device 300, the occurrence of unevenness in illuminance in light emitted from the light source apparatus can be suppressed.

Further, in this embodiment, the light source apparatus is described in which the blue laser diodes which are semiconductor light emitting elements are adopted as the excitation light sources 71 of the excitation light shining device 70 which excites the luminescent material of green wavelength band, and for the other colors than green, that is, red and blue, the red light source device 120 and the blue light source device 300 are provided to generate red light and blue light, respectively. However, a configuration may be adopted in which three excitation light shining devices 70 are provided for three colors of red, green and blue, and ultraviolet laser diodes which emit ultraviolet laser light are provided for each of the excitation light shining devices 70 as semiconductor light emitting elements, and further, first, second and third luminescent wheels are provided as three independent luminescent wheels which emit red, green and blue light, respectively.

In addition, there are provided an optical system which is made up of a mirror or mirrors and a lens or lenses which guide light of red wavelength band emitted from a luminescent material layer of red wavelength band of the first luminescent wheel to the light tunnel 175, an optical system which is made up of a mirror or mirrors and a lens or lenses which guide light of green wavelength band emitted from a luminescent material layer of green wavelength band of the second luminescent wheel to the diffuse plate wheel 176 and an optical system which is made up of a mirror or mirrors and a lens or lenses which guide light emitted from a luminescent material layer of blue wavelength band of the third luminescent wheel to the diffuse plate wheel 176. Then, the excitation light shining devices 70 which are made up of the ultraviolet laser diodes which emit ultraviolet laser light as semiconductor light emitting elements are provided individually for the corresponding luminescent wheels. Thus, by adopting this configuration, the invention may also be applied to the light source apparatus in which ultraviolet laser light is shone on to the luminescent wheels so as to emit red light, green light and blue light.

Further, as luminescent material layers, luminescent material layers may also be added which utilize luminescent materials which emit light of wavelength bands of complementary colors such as yellow (Y) and magenta (M).

In this way, even in the event that the invention is applied to the light source apparatus in which the plurality of excitation light shining devices 70 are provided, the occurrence of unevenness in illuminance in light emitted from the light source apparatus can also be suppressed.

Thus, according to the invention, the light source apparatus and the projector 10 can be provided which can suppress the occurrence of unevenness in illuminance in light which is shone on to the predetermined plane such as the display device 51 or at a projection target such as a screen by diffusing the light of the respective colors while enhancing the efficiency of utilization of light by providing the diffuse plate wheel 176 in proximity to the entrance port of the light guiding device.

In designing the conventional light source apparatus and projectors, the length of the light tunnel 175 is determined so that the pencil of light of the color having the smallest degree of diffusion of luminous intensity distribution characteristics is emitted from the exit port of the light tunnel 175 in such a state that the illuminance thereof is uniformly distributed at the exit port. Consequently, it has been difficult to reduce the length of the light tunnel 175. However, by adopting the configuration of the invention, the light having the narrow luminous intensity distribution characteristics is equalized with the light having the wide luminous intensity distribution characteristics, and thereafter, the light of the respective colors is caused to enter the light tunnel 175. Thus, the length of the light tunnel 175 can be made shorter than that of the conventional light tunnel 175.

According to the invention, the number of light sources is identical to the number of segments having different coefficients of diffusion, and therefore, the rotation of the diffuse plate wheel is controlled so that the segments are illuminated in synchronism with the illumination of the light sources, thereby making it possible to reduce the load of design.

According to the invention, by making the coefficient of diffusion of light of at least one of the plurality of segments zero, in the light source having the wide luminescent intensity distraction characteristics, a risk can be suppressed in which light is diffused more than necessarily to scatter whereby the amount of light entering the light tunnel 175 is reduced. In the event that light from the light source having the wide luminescent intensity distraction characteristics is not diffused more than necessarily, although done in the embodiment, the coefficient of diffusion of light of the diffuse plate which corresponds to the light having the widest luminous intensity distribution characteristics is not made zero but may be designed to be smaller than the coefficients of diffusion of light of the diffuse plates which correspond to the light of the other colors.

According to the invention, by applying the surface treatment through blasting to at least one of the diffuse plates 176R, 176G, 176B so as to form minute irregularities thereon to give it the diffuse effect, the intervals between the minute irregularities can be changed so as to facilitate the setting of the magnitude of diffusing characteristics.

According to the invention, by causing at least one of the diffuse plates 176R, 176G, 176B to contain the diffuse material made of spherical light scattering particles to give it the diffuse effect, the fine adjustment of diffusing characteristics can be facilitated by changing the content density of light scattering particles when the diffuse plates are formed.

According to the invention, the first light source is made up of the laser diodes which emit excitation light of blue wavelength band having the large energy density, and therefore, by shining the excitation light on to the green luminescent material to excite it to emit green luminescent light, a stable luminance of green luminescent light can be obtained.

According to the invention, the second light source is the light emitting diode which emits light of blue wavelength band, and therefore, blue having high color purity can be made use of.

According to the invention, the third light source is the light emitting diode which emits light of red wavelength band, and therefore, red having high color purity can be made use of.

In the embodiment, the light source apparatus is described in which the blue laser diodes which are semiconductor light emitting elements are adopted as the excitation light sources 71 of the excitation light shining device 70 which excites the luminescent material of green wavelength band, and for the other colors than green, that is, red and blue, the red light source device 120 and the blue light source device 300 are provided to generate red light and blue light, respectively. However, a configuration may be adopted in which the second light source is made up of a blue laser diode. In addition, a configuration may be adopted in which the third light source is made up of a red laser diode. Further, a configuration may be adopted in which the first light source is made up of a green laser diode.

In this way, even in the event that the configurations are adopted in which the red laser diode, the green laser diode and the blue laser diode are provided, when a projection image is formed by making direct use of light emitted from the laser diodes, there may be a risk of speckle noise being generated which is minute noise generated by interference of scattering light which is caused to scatter at portions on the screen. However, according to the invention, the diffuse plates are disposed rotatably at the entrance port of the light guiding device. In this configuration, by causing the laser light to pass the diffuse plates, the speckle noise so generated can be reduced.

Additional advantages and modifications will readily occur to those skilled in the art. Therefore, the invention in its broader aspects is not limited to the specific details and representative embodiment shown and described herein. Accordingly, various modifications may be made without departing from the spirit or scope of the general inventive concept as defined by the appended claims and their equivalents.

What is claimed is:
1. A light source apparatus comprising:
  a plurality of light sources which emit light of different wavelength bands and different luminous intensity distributions;
  groups of collective lenses which collect the light from the plurality of light sources;
  a light guiding optical system which collects the light collected by the collective lenses from the plurality of light sources to a same optical axis to illuminate the light onto a predetermined plane;

a light tunnel which is disposed on an axis of the light that is illuminated onto the predetermined plane and is adapted to uniformly distribute the illuminance of the light;

a diffuse plate wheel which is disposed near an entrance port of the light tunnel and which comprises a plurality of segments with different coefficients of diffusion which are arranged in a circumferential direction;

a motor for rotating the diffuse plate wheel; and a light source control device which controls the rotation of the diffuse plate wheel in synchronism with emission of light by of the plurality of light sources;

wherein a length of the light tunnel is shorter than a length necessary to uniformly distribute the illuminance of a beam of light having a narrow luminous intensity distribution among the light of different luminous intensity distributions emitted by the plurality of light sources.

2. A light source apparatus as set forth in claim 1, wherein the number of the light sources and the number of the segments with different coefficients of diffusion are the same.

3. A light source apparatus as set forth in claim 1, wherein the coefficient of diffusion of at least one of the segments is zero.

4. A light source apparatus as set forth in claim 1, wherein at least one of the segments with different coefficients of diffusion is a diffuse plate to which a blasting treatment is applied.

5. A light source apparatus as set forth in claim 1, wherein at least one of the segments with different coefficients of diffusion is a diffuse plate which contains a diffuse material.

6. A light source apparatus as set forth in claim 1, wherein at least one of the light sources comprises a light emitting diode.

7. A light source apparatus as set forth in claim 1, wherein at least one of the light sources is a light source which emits luminescent light by exciting a luminescent material with laser light as excitation light.

8. A light source apparatus as set forth in claim 7, wherein one of the light sources is the light source which emits luminescent light, and the light source which emits luminescent light emits light of a green wavelength band.

9. A light source apparatus as set forth claim 1, wherein at least one of the light sources includes a light emitting diode which emits light of a red wavelength band or a light emitting diode which emits light of a blue wavelength band.

10. A projector comprising:

the light source apparatus as set forth in claim 1, wherein the plurality of light sources comprise a light source which emits light of a red wavelength band, a light source which emits light of a blue wavelength band and a light source which emits light of a green wavelength band;

a display device;

a light source side optical system which guides light emitted from the light source apparatus to the display device;

a projection side optical system which projects an image emitted from the display device on to a screen; and a projector control unit which controls the light source apparatus and the display device.

* * * * *

UNITED STATES PATENT AND TRADEMARK OFFICE
CERTIFICATE OF CORRECTION

PATENT NO. : 8,814,366 B2  
APPLICATION NO. : 13/412992  
DATED : August 26, 2014  
INVENTOR(S) : Makoto Sato Page 1 of 1

It is certified that error appears in the above-identified patent and that said Letters Patent is hereby corrected as shown below:

In the Claims

Column 17, line 12, claim 1:

after "by" delete "of".

Column 18, line 12, claim 9, line 1:

after "forth" insert --in--.

Signed and Sealed this
Seventeenth Day of February, 2015

Michelle K. Lee
*Deputy Director of the United States Patent and Trademark Office*